(12) United States Patent
Xia et al.

(10) Patent No.: US 7,575,707 B2
(45) Date of Patent: Aug. 18, 2009

(54) ELECTROSPINNING OF FINE HOLLOW FIBERS

(75) Inventors: Younan Xia, Seattle, WA (US); Dan Li, Los Angeles, CA (US)

(73) Assignee: University of Washington, Seattle, WA (US)

( * ) Notice: Subject to any disclaimer, the term of this patent is extended or adjusted under 35 U.S.C. 154(b) by 798 days.

(21) Appl. No.: 11/097,975

(22) Filed: Mar. 29, 2005

(65) Prior Publication Data
US 2006/0226580 A1 Oct. 12, 2006

(51) Int. Cl.
- D01D 5/08 (2006.01)
- D01D 5/24 (2006.01)
- D01D 5/34 (2006.01)
- D01F 9/08 (2006.01)
- H05B 7/00 (2006.01)

(52) U.S. Cl. .......... 264/465; 264/172.15; 264/209.1; 264/211.16; 264/623; 264/634; 264/639

(58) Field of Classification Search ........... 264/172.15, 264/209.1, 211.16, 465, 623, 634, 639
See application file for complete search history.

(56) References Cited

U.S. PATENT DOCUMENTS

| | | | |
|---|---|---|---|
| 1,975,504 A | 10/1934 | Formhals | |
| 2,160,962 A | 6/1939 | Formhals | |
| 2,187,306 A | 1/1940 | Formhals | |
| 4,689,186 A | 8/1987 | Bornat | |
| 5,122,670 A | 6/1992 | Mylchreest et al. | |
| 5,157,260 A | 10/1992 | Mylchreest et al. | |
| 6,048,810 A | 4/2000 | Baychar | |
| 6,641,773 B2 | 11/2003 | Kleinmeyer et al. | |
| 6,713,011 B2 | 3/2004 | Chu et al. | |
| 6,752,942 B2 | 6/2004 | Kim et al. | |
| 6,753,454 B1 | 6/2004 | Smith et al. | |
| 2004/0069632 A1 | 4/2004 | Ripoll et al. | |
| 2004/0161498 A1 | 8/2004 | Ripoll et al. | |

(Continued)

OTHER PUBLICATIONS

Ahonen, P., "Aerosol Production and Crystallization of Titanium Dioxide from Metal Alkoxide Droplets," doctoral dissertation, Helsinki University of Technology, Espoo, Finland, Sep. 2001.

(Continued)

*Primary Examiner*—Leo B Tentoni
(74) *Attorney, Agent, or Firm*—Christensen O'Connor Johnson Kindness PLLC

(57) ABSTRACT

A method for electrospinning nanofibers having a core-sheath, tubular, or composite structure is disclosed. The process uses a spinneret having first and second capillaries that channel first and second fluids in the spinneret, the second capillary surrounding the first. A high voltage is applied between the spinneret and a spaced conductive collector. In one embodiment, the first fluid is a mineral oil and the second fluid is a polymeric solution that may include a polymer, a catalyst, a solvent, and a sol-gel precursor. The as-spun nanofiber includes an oil core and a composite sheath. The oil may be removed to produce a composite tubular fiber or the polymer and oil may be removed by calcination to produce a ceramic tubular fiber. In other embodiments, miscible fluids are used to produce porous nanofibers, selected additives functionalize the surfaces of the nanofibers and/or conjugated polymers are used.

23 Claims, 1 Drawing Sheet

U.S. PATENT DOCUMENTS

2006/0213829 A1*   9/2006   Rutledge et al. ............ 210/503
2008/0003168 A1*   1/2008   Barrero Ripoll et al. . 423/447.2

OTHER PUBLICATIONS

"Electrospinning," <http://www.che.vt.edu/Wilkes/electrospinning/electrspinning.html> [retrieved Mar. 7, 2005].

Li, D., and Xia, Y., "Direct Fabrication of Composite and Ceramic Hollow Nanofibers by Electrospinning," *Nano Lett.* 4(5):933-938, Mar. 30, 2004.

Li, D., and Xia, Y., "Electrospinning of Nanofibers: Reinventing the Wheel?" *Adv. Mater.* 16(14):1151-1170, Jul. 19, 2004.

Li, D., et al., "Electrospinning Nanofibers as Uniaxially Aligned Arrays and Layer-by-Layer Stacked Films," *Ad. Mater.* 16(4):361-366, Feb. 17, 2004.

Li, D., et al., "Electrospinning of Polymeric and Ceramic Nanofibers as Uniaxially Aligned Arrays," *Nano Lett.* 3(8):1167-1171, Jul. 8, 2003.

Li, D., et al., "Nanofibers of Conjugated Polymers Prepared by Electrospinning With a Two-Capillary Spinerett," *Adv. Mater.* 16:22, Nov. 18, 2004.

Li, D., et al., "Photocatalytic Deposition of Gold Nanoparticles on Electrospun Nanofibers of Titania," *Chem. Physics Lett.* 394:387-391, Jul. 29, 2004.

Li, D., et al., "Use of Electrospinning to Directly Fabricate Hollow Nanofibers With Functionalized Inner and Outer Surfaces," *Small* 1(1):83-86, 2005.

Loscertales, I.G., et al., "Micro/Nano Encapsulation via Electrified Coaxial Liquid Jet," *Science* 295:1695-1698, Mar. 1, 2002.

McCann, J.T., et al., "Electrospinning of Nanofibers With Core-Sheath, Hollow, or Porous Structures," *J. Mater. Chem.* 15:735-738, 2005.

Pawlowski, K.J., et al., "Electrospun Electroactive Polymers for Aerospace Applications," *Proceedings of AIAA Structures, Structural Dynamics, and Materials Conference*, Norfolk, Va., Apr. 2003.

* cited by examiner

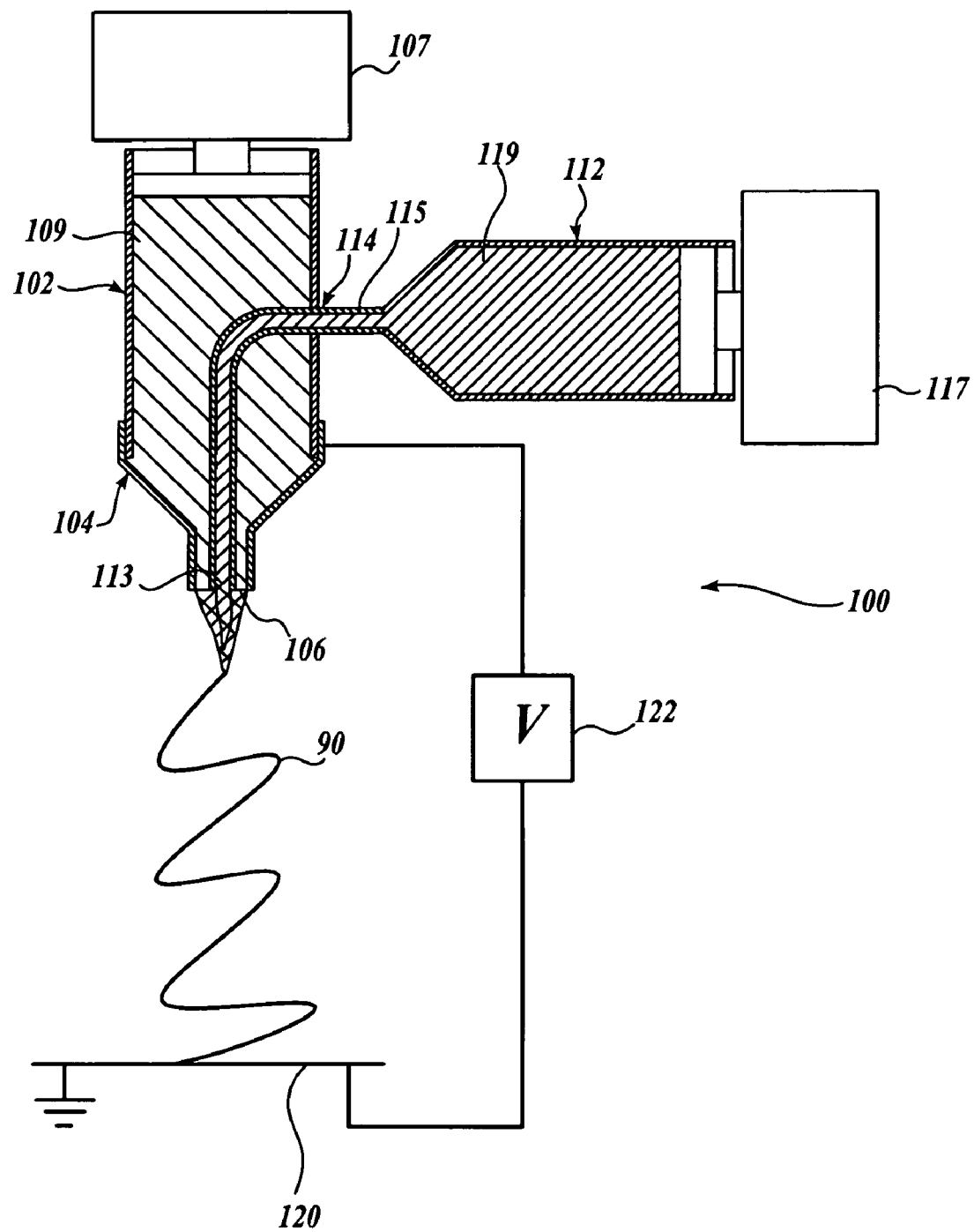

ELECTROSPINNING OF FINE HOLLOW FIBERS

STATEMENT OF GOVERNMENT LICENSE RIGHTS

The U.S. Government has a paid-up license in this invention and the right, in limited circumstances, to require the patent owner to license others on reasonable terms as provided for by the terms of Grant No. F49620-01-1-0358 awarded by the AFOSR (Air Force Office of Scientific Research) and/or Grant No. DMR-9983893 awarded by the NSF (National Science Foundation).

FIELD OF THE INVENTION

The present invention is directed to electrospinning nanofibers and, in particular, to methods for producing nanofibers having a core-sheath, hollow, or porous structure.

BACKGROUND OF THE INVENTION

Electrospinning is a versatile method for generating very thin fibers made of polymers, ceramics, metals, carbon, and/or composite materials. A somewhat similar technique called electrospray can be used to produce a micro/nanometric jet that breaks up to give rise to an aerosol of charged droplets. Electrospray has a proven ability to generate monodisperse aerosols with sizes ranging from a few nanometers to hundreds of microns. Electrospinning, by contrast, typically generates a jet in a high-voltage field to produce elongated polymeric fibers. Compared with electrospray, which uses electro-hydrodynamic forces to generate a number of particles in an aerosol or a hydrosol phase, electrospinning is a more demanding technique that requires the use of a solution with appropriate viscosity, surface tension, and conductivity to produce continuous liquid jets.

In conventional electrospinning, a suitable polymer solution, or melt, is subjected to a high-voltage electrical field to create an electrically charged jet that typically dries or solidifies to create a solid fiber. For example, one electrode from a high-voltage source may be placed into a polymer solution and the other attached to a conductive collector, such as a panel of aluminum foil or a silicon wafer. A typical apparatus for electrospinning utilizes a spinneret with a metallic needle, a syringe pump providing the working fluid to the spinneret, a high-voltage power supply, and a grounded collector. A polymer, sol-gel, or composite solution or melt is loaded into the syringe pump, and this viscous liquid is driven to the needle tip, forming a droplet at the tip. When a voltage is applied to the metallic needle, the droplet is first stretched into a structure called a Taylor cone and, finally, into an electrified jet. The jet is then elongated and whipped continuously by electrostatic repulsion until it is deposited on the grounded collector. The elongation by bending instability results in the formation of uniform fibers that may typically have nanometer-scale diameters.

It is known that nanotubes and nanofibers with core-sheath, hollow, or porous structures have many promising applications in a wide variety of technologies including, for example, microfluidics, photonics, and energy storage. Prior art techniques have used self-assembly methods to build nanotubes from organic building blocks, although there are significant and well-known limitations to this approach. In addition, nanotubes have been fabricated from layered structures by carefully controlling the manufacturing conditions. By this method, nanotubes with diameters less than about 10 nm were created from materials, such as graphitic carbon, metal dichalcogenides, metals, and metal oxides. Fabrication of larger nanotubes and core-sheath nanofibers has been dominated by template-directed approaches. The yield and quality of the resultant material is generally dictated by the efficiency and efficacy of the coating and etching steps used. In particular, it is difficult to create core-sheath and hollow nanofibers of long length using prior art methods due to interconnections between fibers formed during the coating and etching steps.

Disclosed herein is an electrospinning process for the production of micro- and nano-scale core-sheath, hollow, or porous fibers (collectively, nanofibers).

SUMMARY OF THE INVENTION

A method for electrospinning a nanofiber is disclosed, wherein the nanofiber may have, for example, a core-sheath structure, a composite tubular structure, or a ceramic tubular structure. The method uses a spinneret having an outer capillary or needle defining a bore, the needle channeling a first liquid in the spinneret and an inner capillary with a distal end inserted into the needle, the inner capillary channeling a second liquid in the spinneret. A conductive collector, such as a piece of foil or a silicon wafer, is provided a distance from the spinneret and a voltage is applied between the needle and the collector. The first solution is a polymeric solution that may include a polymer, a solvent, and a sol-gel precursor. An acid stabilizer may also be included in the solution. The applied voltage is selected to be sufficiently high to induce electrospinning—that is, such that a jet of fluid is ejected from the spinneret to the collector to form a composite nanofiber.

In an embodiment of the invention, the needle is conductive—for example, stainless steel—and the inner capillary is a polymer-coated silica capillary.

In an embodiment of the invention, the second fluid is an oil, such as mineral oil or olive oil.

In an embodiment of the invention, the as-spun fibers are soaked in an alkane, such as octane, to remove the core material to produce a hollow, composite fiber.

In an embodiment of the invention, the first fluid includes a sol-gel precursor, such as a metal alkoxide.

In an embodiment of the invention, the first fluid includes a polymer, such as poly(vinyl pyrrolidone) (PVP).

In an embodiment of the invention, the second fluid includes an additive, such as an oil-based ferrofluid, tin isopropoxide, a long-chain silane, or a hydrophobic substance.

In an embodiment of the invention, the second fluid is a conjugated polymer solution, such as a solution including poly[2-methoxy-5-(2-ethylhexyloxy)-1,4-phenylenevinylene] (MEH-PPV) and chloroform, or a blend of conjugated polymers and a solvent.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

The figure schematically illustrates an apparatus for electrospinning, according to the present invention.

DETAILED DESCRIPTION OF THE PREFERRED EMBODIMENT

A new method is disclosed for fabricating very small-diameter fibers (nanofibers)—for example, fibers having diameters in the range of tens to thousands of nanometers, using a multi-capillary spinneret in an electrospinning process. The nanofibers may comprise polymers, ceramics, and/or composite materials. This method may be used to produce, for example, core-sheath composite nanofibers, hollow nanofibers having substantially constant wall thickness, nanofibers made with one or more conjugate polymers, nanofibers with highly porous structures, and hollow nanofibers having functionalized surfaces (inner and/or outer).

Referring now to the figure, a schematic diagram of an electrospinning apparatus 100 suitable for practicing the methods described herein is shown. The electrospinning apparatus 100 includes a first container or syringe 102 having a stainless steel hollow needle 104 on one end. A polymer-coated silica capillary 114 extends through the sidewall of the first syringe 102. The distal end 113 of the silica capillary 114 extends through the bore of the needle 104, generally coaxially with the needle 104. An annular aperture 106 is thereby defined between the inner wall of the needle 104 and the outer wall of the silica capillary 114. The proximal end 115 of the silica capillary 114 is connected to a second container or syringe 112.

The first syringe 102 contains a spinnable first polymeric, composite solution, or melt 109 and the second syringe contains a second fluid 119. In order to obtain hollow fibers, the second fluid 119 must be substantially immiscible with the first solution 109. As discussed below, the second fluid 119 may or may not be a polymeric solution. In some embodiments the second fluid is an oil, such as an olive oil or a mineral oil. First and second syringe pumps 107 and 117 are connected to the first and second syringes 102 and 112, respectively. The first polymeric solution 109 can therefore be fed to the annular aperture 106 at a controllable rate and the second liquid 119 can be fed to the silica capillary 114 at an independently controllable rate. A conductive target 120, such as a panel of aluminum foil or a silicon wafer, is disposed a distance below the tip of the stainless steel needle 104. A high-voltage power supply 122 is connected between the stainless steel needle 104 and the conductive target 120, such that a high-voltage potential between these elements may be applied.

Persons of skill in the art will recognize that the described apparatus 100 is suitable for electrospinning nanofibers 90 with a novel spinneret (the needle 104 and silica capillary 114) defining a pair of concentrically-disposed apertures that are independently fed different fluids. It will also be apparent to persons of skill in the art that any number of straightforward modifications to the described apparatus may be made without departing from the spirit of the present invention. For example and not by way of limitation, other suitable materials may be used for forming the spinneret—a collector having two or more spaced portions, for example, to promote a desired alignment of the electrospun fibers may be utilized. It is also contemplated that the capillaries 104, 114 may be non-axisymmetrically nested.

Some contemplated examples of microfibers that may be produced by electrospinning, utilizing the apparatus 100 described above will now be described.

EXAMPLE 1

In this example of the present invention, hollow fibers of ceramic/polymer composite—in the illustrative example, a TiO$_2$/poly(vinyl pyrrolidone) (PVP) composite or pure ceramic nanofibers—were produced utilizing the apparatus 100 shown diagramatically in the figure. In particular, a spinneret having two coaxial apertures was fabricated by inserting a polymer-coated silica capillary 114 with an inner diameter of 75 or 100 microns and an outer diameter of 200 microns into a stainless steel needle 104 having an inner bore diameter of 450 microns, such that the distal end 113 of the capillary 114 is substantially concentric with the bore of the stainless steel needle 104. The needle 104 was hosted on a first plastic syringe 102 and the silica capillary 114 penetrated the wall of the first plastic syringe 102 and connected to a second plastic syringe 112. (The joints were sealed with an epoxy.) A polymeric solution 109 was provided in the first syringe 102, the solution consisting of a polymer, a metal alkoxide sol-gel precursor, an acid, and a solvent; more particularly, the polymeric solution consisted of 0.3 g PVP (with an average molecular weight of about 1,300,000 g/mol), 3 mL titanium tetraisopropoxide, 2 mL acetic acid, and 5 mL ethanol. A heavy mineral oil 119 was provided to the second syringe 112. These two liquids 109, 119 were fed to the spinneret at controlled rates using a pair of digital syringe pumps 107, 117 (e.g., KDS-200, Stoelting, Wood Dale, Ill). In this example, the typical feeding rate for the PVP polymeric solution 109 was 0.6 mL/h and the mineral oil core fluid 119 feeding rate was varied in the range of 0.05 to 0.30 mL/h. The mineral oil feeding rate was varied to selectively control the inner diameters of the resultant hollow fibers.

The stainless steel needle 104 was connected to a high-voltage power supply 122 (e.g., ES30P-5W, Gamma High Voltage Research, Inc., Ormond Beach, Fla.) that is capable of generating DC voltages up to 30 kV and a piece of aluminum foil or silicon wafer 120 was placed about 9 cm below the tip of the needle 104 and grounded to collect the electrospun nanofibers 90. All experiments were conducted in air and the as-spun fibers were left in air for about one hour to allow the Ti(OiPr)$_4$ precursor to completely hydrolyze. The resultant nanofibers 90, therefore, comprised a core-sheath structure wherein the core material was essentially mineral oil and the sheath was substantially a polymer/ceramic composite material.

In some tests, hollow fibers made of TiO$_2$/PVP composite were obtained by extracting the mineral oil from the as-spun fibers 90 by immersing the fibers in an alkane, for example, octane, overnight.

Alternatively, hollow fibers made of substantially pure titania were obtained by calcining the as-spun fibers 90 in air at 500° C. for about one hour. The calcination process also removes the mineral oil, so immersing the fibers in octane is not required to obtain the pure titania fibers.

By replacing the single capillary used in conventional electrospinning with the coaxial spinneret described above, therefore, one has successfully fabricated core-sheath and hollow nanofibers made of ceramics or composites. In this particular example, an ethanol solution containing a sol-gel precursor, and a polymer is loaded into the sheath capillary (stainless steel needle 104) while heavy mineral oil is loaded into the core capillary 114. The desired viscosities and rates of hydrolysis are achieved by carefully tuning the respective concentrations of the materials used and a stable bi-component Taylor cone is formed, resulting in a stable coaxial jet. One of the major obstacles involved in the formation of core-sheath or hollow nanofibers is the instability of the core. The role of the polymer (e.g., PVP) is to adjust the viscoelasticity of the liquid suitable for electrospinning. Although polymer-free viscous inorganic sols can be used in the liquid 109, it is difficult to control the viscoelasticity of the liquid. Moreover, it is also very difficult to obtain hollow fibers with inner diameters less than 100 nm. The use of a combination of a polymer and a sol-gel precursor makes it convenient to the formation of good-quality nanofibers. In particular, gelation in the outer surface of the sheath during the spinning process can enhance the mechanical strength of the sheath and prevent structural breakdown, resulting in fibers with a stable morphology when deposited on the collector. The use of sol-gel precursors for the creation of ceramic nanofibers holds much promise as there is a relatively plentiful library of sol-gel precursors and hydrolysis catalysts. By tuning the sol-gel mixtures, a range of new fibers with controlled core-sheath morphology can be fabricated. The as-spun core-sheath fibers can be made hollow by extracting the mineral oil core with a solvent or the core and polymer from the wall may be removed by calcination to produce polycrystalline ceramic nanotubes with lengths up to several hundred micrometers (or greater). In the present example, after calcinations, the PVP phase was entirely burnt off and the titania became polycrystalline anatase. The diameter and shell thickness of these hollow nanofibers can be conveniently tuned by adjusting the flow rates of liquids in the inner and outer capillaries and the concentrations of the polymer and the metal alkoxide(s).

Further details of the process and verification of the results described above is presented in "Electrospinning of Nanofibers With Core-Sheath, Hollow, or Porous Structures," *J. Mater. Chem.* 15, pp. 735-738, 2005, which is hereby incorporated by reference in its entirety.

For producing continuous and uniform hollow fibers, the immiscibility of core and sheath liquids was found to be most crucial. We have attempted to replace the mineral oil with some polymer solutions while using the same solution for the sheath. In this case, no hollow structure was observed after the PVP had been removed by extraction with ethanol or by calcination at an elevated temperature, although the core liquid was sufficiently viscous to be electrospun as fibers with diameters as thin as a few hundred nanometers. This result implies that the core and sheath solutions were completely mixed during the electrospinning process.

It has been found, however, that porous fibers can be generated by using an appropriate combination of miscible fluids in the spinning process. In one application, for example, we examined the use of a solution of polystyrene (PS) in a mixture of N,N-dimethyl formamide (DMF) and tetrahydrofuran (THF) as the core liquid (note that the PS solution is also spinnable independently). Here the solvents (DMF/THF and ethanol) are miscible, although the two polymers (PS and PVP) are immiscible. Nanofibers were electrospun, as discussed above, and then calcined in air to remove both the PVP and the PS. The resulting titania nanofibers were composed of segments of solid titania structures with smooth surfaces alternating with segments of highly porous titania. A range of feeding rates from 0.05 to 0.3 mL/h was tested for the PS solution and all samples exhibited similar structure. These results indicate that the core and sheath solutions were also mixed in the spinning process, but in a way very different from the system where a PVP solution served as the core. As the solvents diffused into each other, the PS and PVP chains were brought together to form a more or less homogeneous mixture in certain regions of each liquid jet. As the solvents evaporated quickly in the spinning process, these two polymer phases were separated to generate nanoscale domains of PS within the TiO2/PVP matrix. When the PS phase was removed by calcination (together with the PVP), the resultant fibers became highly porous in the PS-rich regions. This shows that the morphology and structure of electrospun fibers may be controlled by varying the polymers contained in the core and sheath solutions. In a similar experiment, a solution of poly(styrene) in DMF-THF was spun from the core capillary, while a TiO2-PVP solution was spun from the sheath capillary. Upon calcination, the remaining titania fibers had a highly porous structure with no defined core-sheath morphology.

Further details of the process and verification of the results described above are presented in "Direct Fabrication of Composite and Ceramic Hollow Nanofibers by Electrospinning," *Nano Letters* 4(5):933-938, 2004, which is hereby incorporated by reference in its entirety.

EXAMPLE 2

By modifying the mineral oil core fluid 119 with various precursors, hollow nanofibers containing different functional components may be fabricated. For example, hollow nanofibers of titania containing iron oxide nanoparticles were obtained by feeding a dilute, oil-based ferrofluid to the core capillary 114, followed by alkane (e.g. octane) extraction of the oil phase. The resultant nanofibers were magnetically active. Alternatively, by adding tin isopropoxide to the oil core fluid, hollow titania nanofibers with tin oxide nanoparticles coating their inner surfaces have also been fabricated.

In order to extend the utility of composite and ceramic hollow nanofibers in applications, such as catalyst supports, optical waveguides, and nanofluidic devices, selective modification and differentiation of the inner and/or outer surfaces are highly desirable. Derivatizing the surfaces of these hollow nanofibers with different functional groups changes the surface chemistry, thereby allowing tuning of properties, such as fluid flow, and allowing for the attachment of nanoparticles and other active compounds by chemical reaction with the derivative groups. By using oil-soluble, long-chain silanes (with 18 carbons), the inner and outer surfaces of titania nanofibers can be selectively modified. For example, the inner surface can be made hydrophobic by doping the oil with methyl-terminated silane. In addition, this coating on the inner surface could be used to differentiate the inner and outer surfaces. If the inner surface was first coated with methyl-terminated silane, it was protected when the sample was subsequently immersed in amine-functionalized silane. Therefore, the inner surface of the nanofiber was not reactive when it was immersed in a solution of gold nanoparticles and the nanoparticles selectively adhered only to the outer surfaces of the nanofibers. This demonstrates an easy technique for differentiation of the inner and outer surfaces of hollow nanofibers.

Our experiments indicate that any molecular species soluble or dispersible in the oil phase may be directly incorporated into the interiors of nanofibers as they are electrospun from the spinneret. For example, an amphiphilic fluorescent dye ($DiIC_{18}$) has been added to the mineral oil to demonstrate the concept. Fluorescence microscopy images of hollow fibers whose channels were filled with $DiIC_{18}$-doped mineral oil show clearly that the dye molecules were evenly distributed within the electrospun nanofibers. It is believed that the dye molecules had been adsorbed onto the inner surfaces of the nanofibers through interaction between their hydrophilic units and the hydroxy groups of titania.

Using the same strategy, nanoparticles dispersible in the oil phase could also be incorporated into the interiors of the hollow nanofibers. For example, it is known that many types of surfactant-protected nanoparticles can form stable dispersions in mineral oil. Hollow nanofibers have been loaded with superparamagnetic iron oxide nanoparticles by adding a commercially-available, oil-based ferrofluid to the mineral oil before it was co-electrospun with a $PVP/Ti(OiPr)_4$ solution. The oil was later extracted by immersing the sample in octane to leave behind the iron oxide nanoparticles inside each hollow fiber. It was found that the resultant composite nanofibers could be attracted by a magnet, which indicates that these fibers could be magnetically manipulated for further processing and application.

In another experiment, we incorporated nanoparticles into hollow nanofibers by pre-encapsulating a precursor in the oil core, followed by a full post-spinning treatment. This idea was demonstrated by dissolving tin isopropoxide in the mineral oil, followed by co-electrospinning with a PVP/Ti(OiPr)$_4$ solution. Calcination of the as-spun nanofibers at an elevated temperature led to the formation of $SnO_2$ nanoparticles coated on the inner surface of each hollow titania fiber.

The inner and outer surfaces of the hollow nanofibers may be independently functionalized by incorporating an appropriate silane into the oil phase, followed by the formation of self-assembled monolayers on the outer surfaces with another type of silane. For example, when a small amount of octadecyltrichlorosilane (OTS) was added to the mineral oil, the OTS molecules would react with the hydroxy groups of titania (on the inner surface) to form a long-chain siloxane monolayer, thereby rendering the inner surface of the hollow nanofiber hydrophobic. When soaked in octane that contained iron oxide nanoparticles (oil-based ferrofluid), the particles could easily enter the nanometer-sized fiber tubes through capillary action. In comparison, very few particles could enter the tubes if no OTS was added to the mineral oil core fluid. Once the inner surfaces of hollow nanofibers had been derivatized with the hydrophobic OTS monolayer, the outer surfaces could be functionalized with a different silane by coupling with the hydroxy groups. We have demonstrated this concept using 3-aminopropyltrimethoxysilane, a $NH_2$-terminated silane. It is well known that amine-modified surfaces are capable of adsorbing citrate-stabilized gold nanoparticles through electrostatic interactions, whereby gold nanoparticles were deposited only on the outer surfaces of the nanofibers. For comparison, if OTS was not added to the mineral oil, both inner and outer surfaces of the hollow nanofibers were decorated with gold nanoparticles once they had been treated with amine-terminated silane. Therefore, using the methods described herein, the inner and outer surfaces of hollow electro-spun nanofibers can be fabricated with inner and outer surfaces independently functionalized by adding a silane species to the oil phase.

In the present example, an electrospinning apparatus, including a spinneret consisting of two coaxial capillaries, was fabricated as discussed above. In particular, a solution of PVP (0.3 g with a molecular weight of about 1,300,000) titanium tetraisopropoxide (3 g), acetic acid (2 mL), and ethanol (5 mL) was added to a first syringe 102 connecting to the annular aperture 106 between the metal needle 104 and silica capillary 114, and a heavy mineral oil containing dye molecules, silane, magnetic nanoparticles, or tin tetraisopropoxide was added to the second syringe 112 connected to the silica capillary 114. These two solutions were fed to the respective capillaries using the separate syringe pumps 107, 117. The typical feeding rates for the PVP solution and mineral oil were set at 0.8 and 0.2 mL/h, respectively. The metallic needle 104 was functionally connected to the high-voltage supply 122 and a piece of aluminum foil or silicon wafer 120 was placed 9 cm below the tip of the needle 104 to collect the nanofibers 90. The voltage was fixed at 13.5 kV. All experiments were conducted at room temperature in air and the as-spun fibers were left in air for about one hour to allow the Ti(OiPr)$_4$ to completely hydrolyze. The mineral oil was extracted by immersing the fibers in octane overnight if desired.

For the encapsulation of organic dye molecules, 1 mg of a fluorescent dye (DiIC$_{18}$) was dissolved in heavy mineral oil (10 mL). For the encapsulation of magnetic nanoparticles in the fibers, heavy mineral oil (2 mL) and an oil-based ferrofluid (EFH1, 2 mL) were mixed and heated to 100° C. for three hours to remove any volatile solvent that might be included in the commercial sample. This mixture was then used as the core material. For the fabrication of titania nanofibers incorporated with $SnO_2$ nanoparticles, tin tetraisopropoxide (1 g) was dissolved in mineral oil (5 mL). The as-spun fibers were then calcined in air at 500° C. for about one hour.

For the preparation of nanofibers with hydrophobic inner surfaces, mineral oil containing 1 wt % OTS was used as the core material. After extraction with octane at room temperature, the fibers were dried at 100° C. for about four hours to allow octane to evaporate completely.

In another related application, an amphiphilic fluorescent dye (dIiC$_{18}$) was added to the mineral oil in the second syringe. The resulting as-spun nanofibers had channels filled with DiIC$_{18}$-doped mineral oil. The dye molecules were evenly distributed within each fiber, and were substantially retained inside the nanofibers even after the oil phase had been extracted with octane. It is believed that the dye molecules had been adsorbed onto the inner surfaces of the fibers through interactions between their hydrophilic units and the hydroxy groups of titania. This method provides a simple means to load hollow nanostructures with various fluorescent dyes that are soluble in mineral oil. The incorporation of such dyes should also make it easier to evaluate the continuity and uniformity of the oil thread inside each fiber. This feature can be particularly important and useful for on-line quality control when the hollow fibers are commercially manufactured on a large scale.

Further details of the process and verification of the results described above is presented in "Use of Electrospinning to Directly Fabricate Hollow Nanofibers With Functionalized Inner and Outer Surfaces," *Small* 1(1), pp. 83-86, 2005, which is hereby incorporated by reference in its entirety.

EXAMPLE 3

In another application of the present invention, the two-capillary, core-sheath, electrospinning process provided a novel method for producing electrospinning fibers of conjugated polymers. Conjugated polymers are important for their unique combination of electronic, optical, and mechanical properties. Nanowires or nanofibers made of conjugated polymers present an ideal system for studying charge transport and luminescence in one-dimensional systems and hold promise as the building blocks for nanoelectronics. However, conventional electrospinning requires the use of an appropriate solvent and polymer system to prepare solutions exhibiting the desired viscoelastic behavior. In particular, the traditional setup for electrospinning is not easily applied to polymers with limited solubilities (e.g., conjugated polymers) or low molecular weights. One prior art strategy for improving the spinnability of conjugated polymers is to blend these polymers with other spinnable polymers in solution. But this method requires a solvent that is capable of dissolving both blend components and that is suitable for electrospinning.

According to teachings of the present invention, however, it has been found that a solution of a conjugated polymer dissolved in an appropriate solvent can be co-electrospun with a suitable, more spinnable solution through a two-capillary spinneret, even though these two solutions are not compatible in the conventional mixing process. For example, a solution of the conjugated polymer poly[2-methoxy-5-(2-ethylhexyloxy)-1,4-phenylenevinylene] (MEH-PPV) dissolved in chloroform, which could not be electrospun in a conventional electrospinning process, was found to be co-spinnable in the inner capillary 114 of the two-capillary spinneret discussed above, with a spinnable solution of poly(vinyl pyrrolidone) (PVP) in an ethanol/water mixture co-spun in the outer capillary (annulus) 106. The PVP outer sheath could then be removed by ethanol extraction.

In the present example, an electrospinning apparatus, including a spinneret consisting of two coaxial capillaries, was fabricated as discussed above. In particular, a polyimide-coated silica capillary 114 was guided to penetrate the wall of a first plastic syringe 102 and inserted into a stainless steel 104 needle mounted on the first syringe 102. A second syringe 112 was operatively connected to the silica capillary 114 A solution containing 0.6 g. poly(vinyl pyrrolidone) (PVP) having a weight-average molecular weight of about 1,300,000 g/mol, 1.5 mL water, and 8.5 mL ethanol was added to the first syringe 102 and a poly[2-methoxy-5-(2-ethylhexyloxy)-1,4-phenylenevinylene] (MEH-PPV) having a molecular weight of approximately 1,00,000 g/mol solution in chloroform was provided to the second syringe 112. The two solutions were fed into the capillaries (silica capillary and steel needle) by two syringe pumps 107, 117, as described above. The feed rate for the PVP solution was set at 0.6 mL/h. The feed rate for the MEH-PPV solution was varied in the range of 0.05-0.3 mL/h. The stainless steel needle 104 was connected to a high-voltage power supply 122 capable of producing a 30 kV potential and a piece of aluminum foil or a silicon wafer 120 was placed about 9 cm below the tip of the needle and grounded to collect the nanofibers 90. The spinning voltage was set at 7.5 kV. PVP was extracted from the nanofibers by immersing the as-spun fibers in ethanol for two hours, leaving fibrous structures with homogeneous fluorescence emission characteristic of MEH-PPV. The samples were then dried overnight at 60° C. in a vacuum oven.

We have also demonstrated fabrication of nanofibers of MEH-PPV blended with other conjugated polymers. With the same setup, we used a blend solution of MEH-PPV and poly(3-hexylthiophene) (PHT) for electrospinning. In the case of conjugated polymers, formation of blends represents one of the simplest and most effective means for tuning their electronic and optoelectronic properties. For example, blending can lead to various novel phenomena, such as enhanced electroluminescence, photoinduced charge transfer, ambipolar charge transport, and lasing. It is also noteworthy, as mentioned above, that the present method provides the ability to electrospin materials that are not otherwise amenable to electrospinning.

Further details of the apparatus and process utilized, including images of the produced nanofibers and extensions of the process utilizing a blend solution of MEH-PPV and poly(3-hexylthiophene) (PHT) that may be useful for tuning the electronic and optoelectronic properties of the fibers, can be found in "Nanofibers of Conjugated Polymers Prepared by Electrospinning With a Two-Capillary Spinneret," *Advanced Materials* 16(22):2062, Nov. 18, 2004, which is hereby incorporated in its entirety.

While the preferred embodiment of the invention has been illustrated and described it will be appreciated that various changes can be made therein without departing from the spirit and scope of the invention.

The embodiments of the invention in which an exclusive property or privilege is claimed are defined as follows:

1. A method for electrospinning a nanofiber comprising:
   providing a spinneret having a needle defining a bore, the needle fluidly connected to a first liquid comprising a spinnable polymeric solution, and a capillary having a proximal end connected to a second liquid and a distal end disposed in the needle bore such that an annular aperture is defined between the needle and the capillary;
   providing a conducting collector disposed a distance from the needle;
   applying a voltage between the needle and the conducting collector; and
   feeding the polymeric solution through the needle and feeding the second liquid through the capillary;
   wherein the applied voltage is sufficiently high to induce a jet made of the polymeric solution and the second liquid to travel from the spinneret to the collector to form a composite nanofiber.

2. The method of claim 1, wherein the needle is a conductive metal.

3. The method of claim 2, wherein the capillary is a polymer-coated silica capillary.

4. The method of claim 3, wherein the needle and capillary are substantially axisymmetrically disposed.

5. The method of claim 1, wherein the polymeric solution includes a polymer and a sol-gel precursor.

6. The method of claim 5, wherein the sol-gel precursor is a metal alkoxide.

7. The method of claim 5, wherein the polymer is poly (vinyl pyrrolidone).

8. The method of claim 5, wherein the polymeric solution further comprises an acid stabilizer and a solvent.

9. The method of claim 8, wherein the acid stabilizer is acetic acid and the solvent is ethanol.

10. The method of claim 5, wherein the polymeric solution and the second fluid are immiscible.

11. The method of claim 1, wherein the second fluid comprises an oil.

12. The method of claim 11, wherein the second fluid further comprises an additive selected from a molecular species soluble in the oil or nanoparticles that form a stable dispersion in the oil.

13. The method of claim 12, wherein the additive is selected from an oil-based ferrofluid and tin isopropoxide.

14. The method of claim 12, wherein the additive is a long-chain silane.

15. The method of claim 12, wherein the additive is a hydrophobic substance.

16. The method of claim 1, wherein the second fluid comprises a conjugated polymer solution.

17. The method of claim 1, wherein the conjugated polymer solution comprises MEH-PPV and chloroform.

18. The method of claim 1, wherein the conjugated polymer solution comprises a blend of conjugated polymers and a solvent.

19. The method of claim 18, wherein the blend of conjugated polymers comprises MEH-PPV and PHT, and chloroform.

20. The method of Claim 11, further comprising the step of soaking the composite nanofiber in a solvent to remove the second liquid such that a hollow nanofiber remains.

21. The method of claim 20, wherein the solvent is an alkane.

22. The method of claim 11, further comprising the step of calcining the composite nanofiber such that a hollow ceramic fiber remains.

23. The method of claim 22, wherein the calcination temperature is about 500° C.

* * * * *

UNITED STATES PATENT AND TRADEMARK OFFICE
CERTIFICATE OF CORRECTION

PATENT NO. : 7,575,707 B2　　　　　　　　　　　　　　　　　　　　　　Page 1 of 1
APPLICATION NO. : 11/097975
DATED : August 18, 2009
INVENTOR(S) : Xia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO.       : 7,575,707 B2
APPLICATION NO.  : 11/097975
DATED            : August 18, 2009
INVENTOR(S)      : Y. Xia et al.

It is certified that error appears in the above-identified patent and that said Letters Patent is hereby corrected as shown below:

| COLUMN | LINE | ERROR |
|---|---|---|
| 1 | 7-13 | Delete the paragraph beginning "The U.S. Government..." and ending "(National Science Foundation)." and substitute therefor --This invention was made with U.S. government support under Grant F49620-01-1-0358 awarded by the Air Force Office of Scientific Research (AFOSR) and Grant DMR-9983893 awarded by the National Science Foundation (NSF). The U.S. Government has certain rights in the invention.-- |

Signed and Sealed this

Twenty-eighth Day of September, 2010

David J. Kappos
*Director of the United States Patent and Trademark Office*